(12) United States Patent
Daniel

(10) Patent No.: US 6,816,466 B1
(45) Date of Patent: Nov. 9, 2004

(54) AUTOMATIC MODULE CONFIGURATION IN A TELECOMMUNICATIONS POWER SYSTEM

(75) Inventor: Francois Daniel, St-Laurent (CA)

(73) Assignee: Astec International Limited, Kowloon (HK)

( * ) Notice: Subject to any disclaimer, the term of this patent is extended or adjusted under 35 U.S.C. 154(b) by 683 days.

(21) Appl. No.: 09/586,367

(22) Filed: Jun. 2, 2000

(51) Int. Cl.[7] .................................................. H02J 1/10
(52) U.S. Cl. ...................................................... 370/254
(58) Field of Search ................................ 370/254, 445, 370/447, 455, 463, 474; 307/31, 42; 710/8, 9, 10, 300, 301, 302, 104; 713/300, 340; 709/220, 222, 245

(56) References Cited

U.S. PATENT DOCUMENTS

| | | | | |
|---|---|---|---|---|
| 5,854,454 A | * | 12/1998 | Upender et al. | ............. 187/247 |
| 5,982,652 A | | 11/1999 | Simonelli et al. | |
| 6,009,479 A | * | 12/1999 | Jeffries | ........................... 710/8 |
| 6,522,654 B1 | * | 2/2003 | Small | ......................... 370/400 |
| 6,629,247 B1 | * | 9/2003 | Hall et al. | .................. 713/300 |
| 6,650,967 B1 | * | 11/2003 | Got et al. | .................... 700/286 |
| 2001/0033502 A1 | * | 10/2001 | Blair et al. | ................... 363/65 |

FOREIGN PATENT DOCUMENTS

| | | |
|---|---|---|
| EP | 0977412 A1 | 2/2000 |
| EP | 1004966 A2 | 5/2000 |
| WO | WO 01/73920 A2 * 10/2001 | ............. H02J/9/00 |

OTHER PUBLICATIONS

Bosch, Robert. "CAN Specification Version 2.0". Sep. 1991. pp. 1–68.*

* cited by examiner

Primary Examiner—Chi Pham
Assistant Examiner—Derrick W Ferris
(74) Attorney, Agent, or Firm—Harness, Dickey & Pierce, P.L.C.

(57) ABSTRACT

An automatic configuration system for a telecommunications power system includes a power bus and a communications bus. A controller that is connected to the communications bus employs a serial communications protocol. A module transmits an identification signal to the controller that contains an identification number of the module. The modules include rectifier modules, battery connection modules and distribution modules. Each module transmits the identification signal after the module is initially connected to the power bus and the communications bus. The controller receives the identification signal from the module. The controller stores the identification number and generates a module ID for the module that is transmitted to the module for use by the module in further serial communications with the controller.

17 Claims, 5 Drawing Sheets

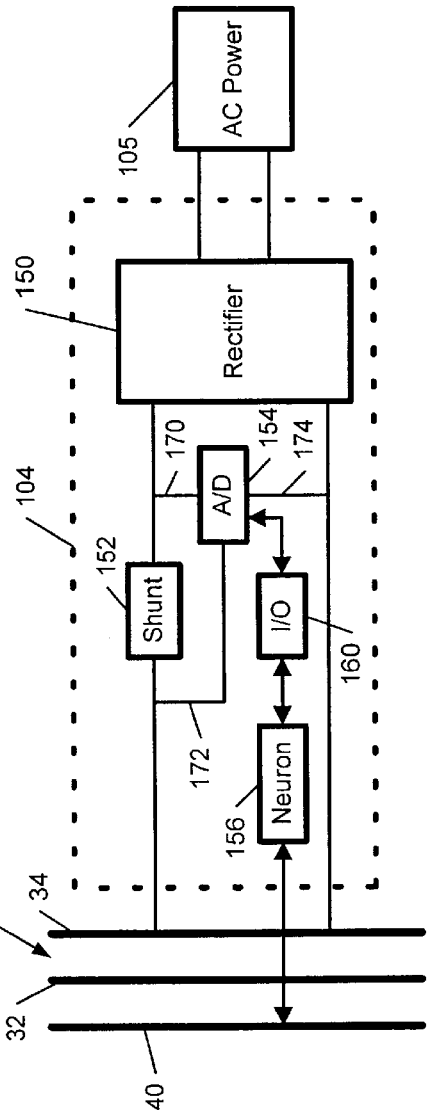

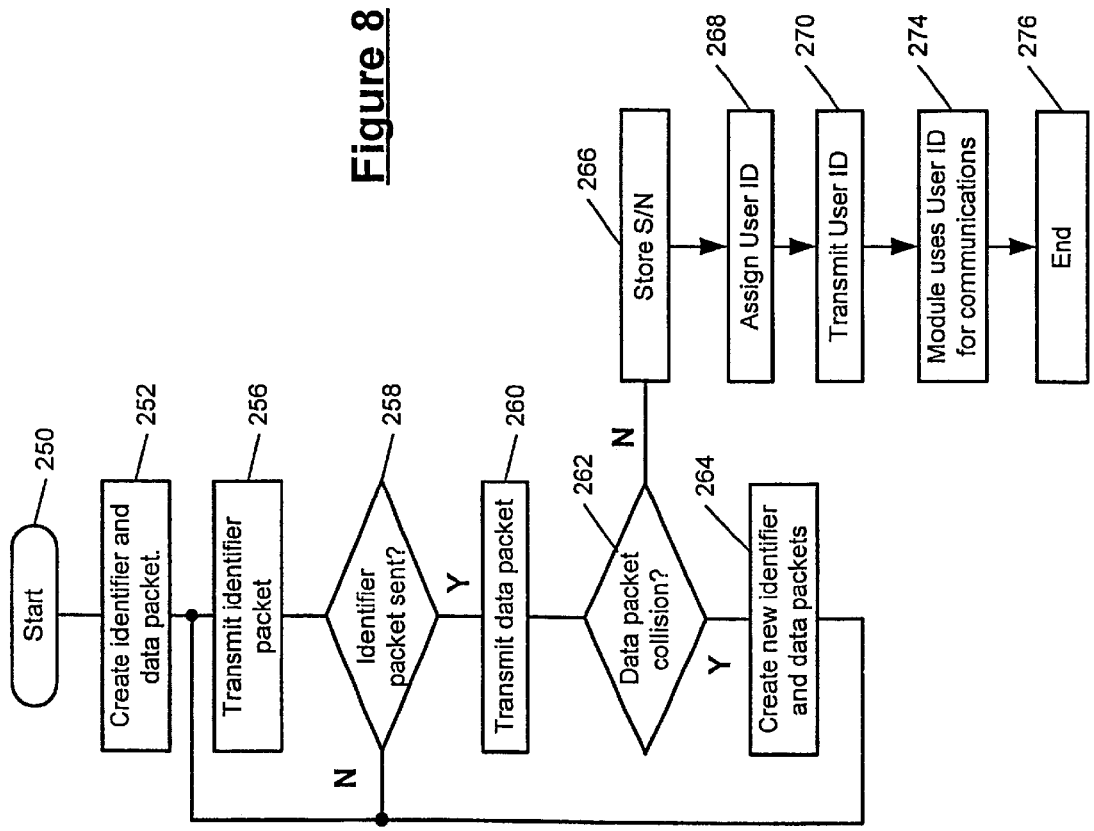

ns power system. A controller associated with the telecommunications power system receives and stores the serial number of the module and assigns a module ID for subsequent communications with the controller and other modules. Because an identifier packet of the serial communications protocol cannot accommodate the entire serial number, part of the serial number is coded into the identifier packet and the remaining part is coded in the data packet. If collisions between the data packets associated with two modules occur, new identifier packets and data packets are coded and transmitted until collision does not occur and the module ID is assigned.

BRIEF DESCRIPTION OF THE DRAWINGS

FIG. 5 is a functional block diagram of the rectifier module of FIGS. 2 and 3 in further detail;

FIG. 7A illustrates an identifier packet employed by a serial communications protocol;

FIG. 7B illustrates a data packet employed by the serial communications protocol; and FIG. 8 is a flow chart illustrating steps for automatically configuring a module for communications in the serial communications system.

DETAILED DESCRIPTION OF THE PREFERRED EMBODIMENTS

Figure 1:
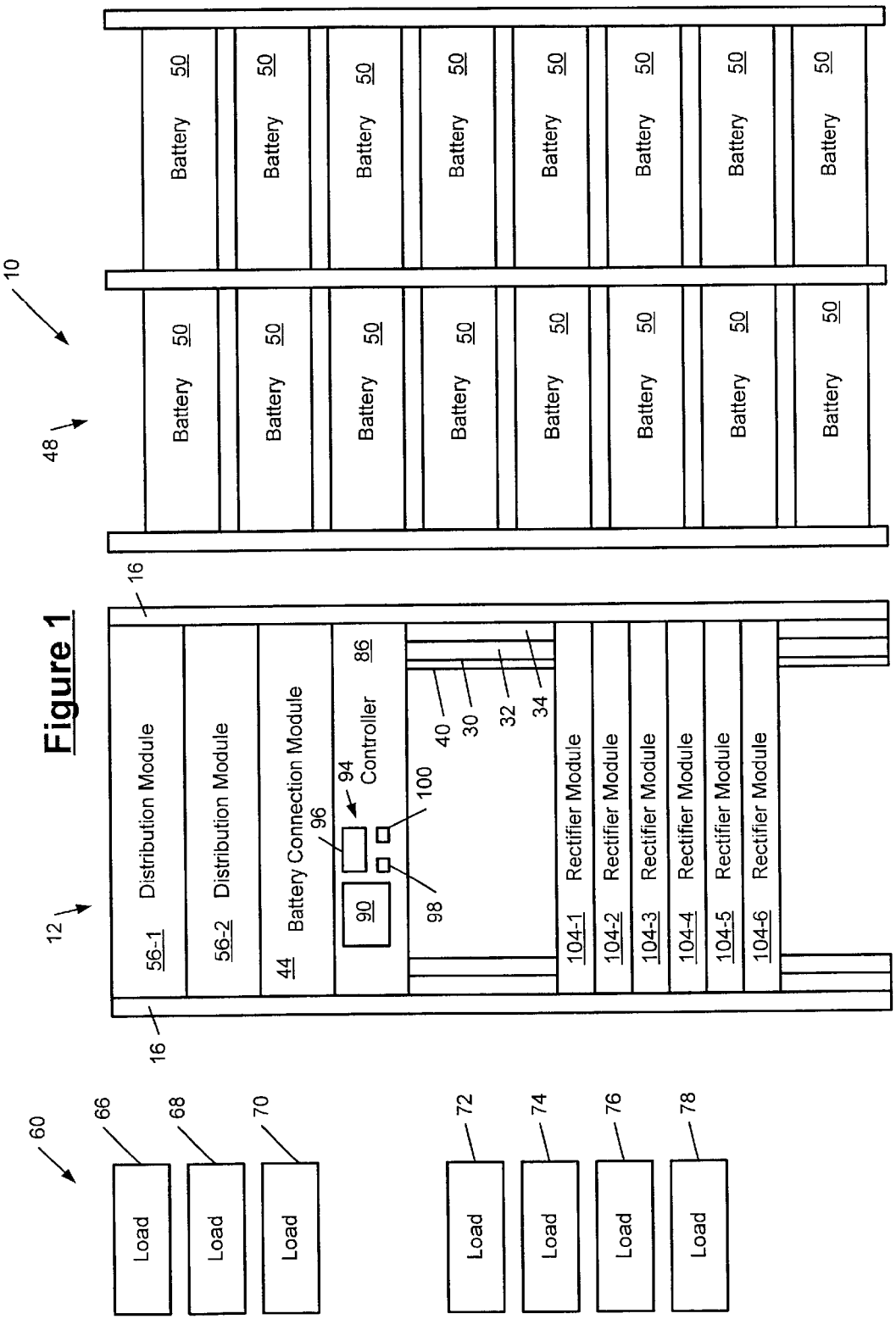
FIG. 1 is a block diagram illustrating a telecommunications power system that includes a frame that is connected to multiple loads, and a battery pallet with a plurality of battery cells according to the invention.

Referring now to FIG. 1, a telecommunications power system 10 includes one or more frames 12 that include a rack 16. A direct current (DC) bus 30 includes first and second conductors 32 and 34 that extend along the rack 16 in a vertical direction. An insulating layer (not shown) separates the first and second conductors 32 and 34. A communications bus 40 is located adjacent the DC bus 30 and likewise includes a layer (not shown) that insulates the communications bus 40 from the first and second conductors 32 and 34.

The design of the telecommunications power system 10 is modular such that the capacity of the system can be easily changed by adding or removing modules from the telecommunications power system 10. The design of the telecommunications power system 10 has been optimized through the use of modular connectors (not shown) to facilitate the connection and disconnection of the modules from the frame 12.

The telecommunications power system 10 includes one or more battery connection modules 44 that are connected to the DC bus 30 and the communications bus 40. The battery connection module 44 is connected to a pallet of batteries 48 that includes a plurality of battery cells 50. In a preferred embodiment, each battery cell 50 provides a two-volt output and a relatively high current output. The battery cells 50 are connected into battery strings (identified at 106 in FIG. 2) that contain 24 to 26 battery cells. Each battery string provides 48 VDC for telephone switch and router applications. Depending upon the length of time desired for the battery backup period and the size of loads to be supplied, the size and/or number of batteries may be varied. Skilled artisans can appreciate that other voltages, string sizes and packaging arrangements can be employed if desired.

One or more distribution modules 56 are connected to the DC bus 30 and the communications bus 40. The distribution modules 56 distribute power to one or more loads 60 such as telecommunications switches, cellular equipment and routers. For example in FIG. 1, the distribution module 56-1 delivers power to loads 66, 68 and 70. The distribution module 56-2 delivers power to loads 72, 74, 76, and 78. Connections between the loads and the backup batteries have been omitted for purposes of clarity.

A master controller 86 is connected to the DC power bus 30 and the communications bus 40. The master controller 86 includes a display 90 and an input device 94 that may include a touch pad 96 and buttons 98 and 100. An alternate display can be a computer monitor. The input device 94 and the display 90 can be combined into a touch screen display. A keyboard and a mouse may be employed. The master controller 86 preferably provides an Internet browser-like interface that is navigated using the touchpad 96 in a conventional point-and-click manner or using the touchpad 96 and the buttons 98 and 100. Alternately, a text-based, menu-driven interface can be provided.

The telecommunications power system 10 further includes one or more rectifier modules 104 that are connected to the DC bus 30 and the communications bus 40. Each of the rectifier modules 104 is individually connected through a circuit breaker (not shown) to one or more AC power sources 105 such as that provided by utilities or other power generating devices.

Figure 2:
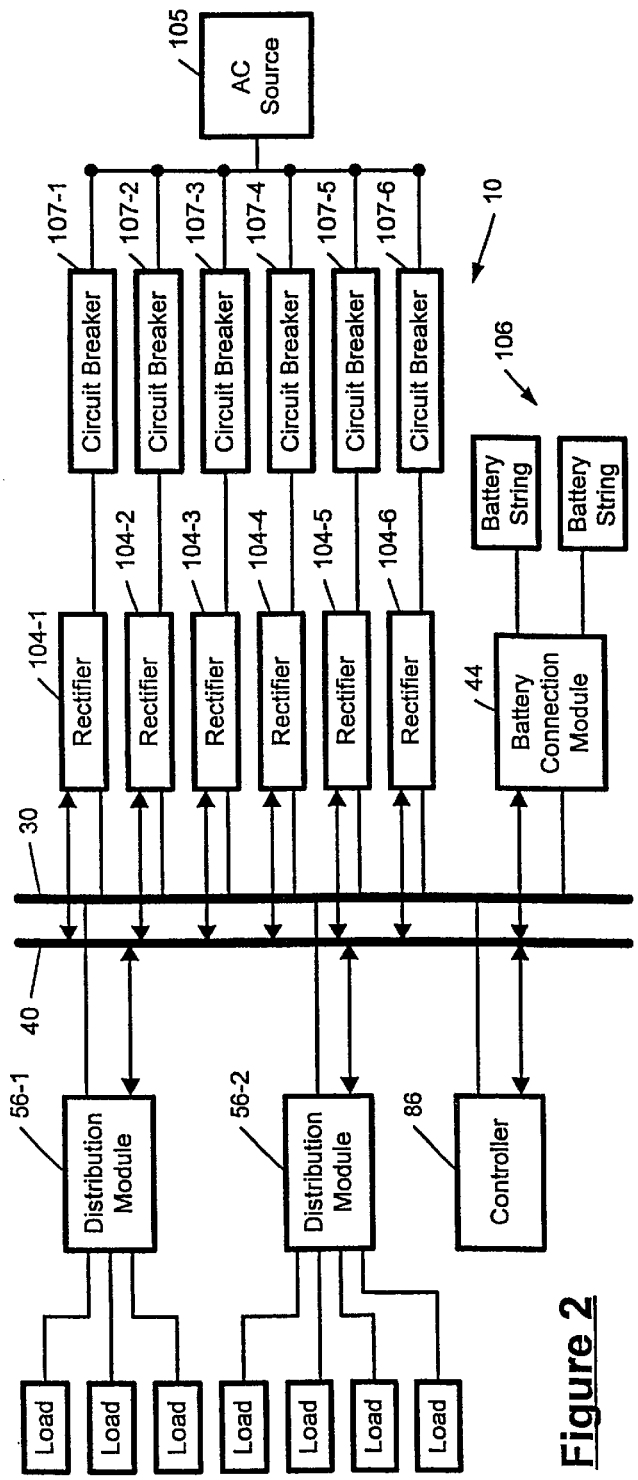
FIG. 2 is a functional block diagram of FIG. 1.

Referring now to FIG. 2, the telecommunications power system 10 in FIG. 1 is illustrated in further detail. In use, the AC power source 105 provides voltage that is typically between 80 and 300 VAC and that has a frequency between 45 and 65 Hz. The rectifier modules 104 rectify the AC power and provide a controllable output voltage and current. For telephone switch and router applications, the rectifiers are rated at 48 VDC nominal at 50 or 200 amps. During operation, the rectifiers 104 operate at a float voltage that is typically between 52 and 54 VDC (depending upon battery characteristics) to prevent battery discharge. Skilled artisans can appreciate that other voltage and current levels may be provided by the rectifiers without departing from the spirit of the invention.

Depending upon the type of batteries employed, the output voltage of the rectifier modules 104 will normally be higher than 48 volts. One or more battery strings 106 are connected to the battery module 44. Typically, the rectifier modules 104 operate at a float voltage of the batteries such that the batteries during normal operation discharge little or no current and the backup batteries are maintained in a charged state. The rectifier modules 104 preferably include a shunt and an analog to digital (A/D) converter for sensing rectifier voltage and rectifier current. The rectifier module 104 transmits the rectifier voltage and current signals to the controller 86 via the communications bus 40. Preferably, the controller employs a serial communications protocol that is insensitive to noise. In a preferred embodiment, the communications system employs CAN protocol such as CAN 2.0B.

The distribution modules 56 include one or more circuit breakers that are preferably modular plug-in circuit breakers to facilitate installation and removal. The distribution module connects the loads 60 to the power bus 30.

Figure 3:
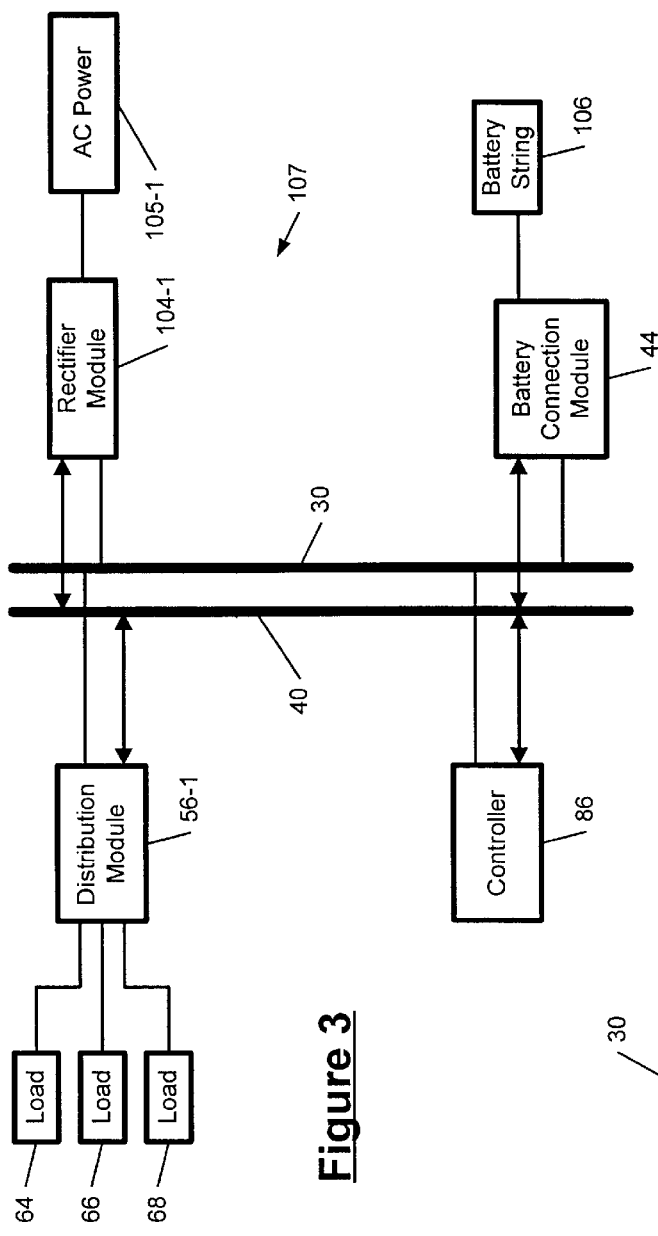
FIG. 3 is a functional block diagram of a partially configured telecommunications power system.

Referring now to FIG. 3, a partially configured telecommunications power system 107 is illustrated. Reference numerals from FIGS. 1 and 2 are used where appropriate. Initially, the master controller 86 is connected to the DC bus 30 and the communications bus 40. Preferably, at least one rectifier module 104 and/or a backup battery is connected to provide power for the master controller 86. As each of the modules (distribution module 56-1, rectifier module 104-1 and battery connection module 44) are connected to the DC bus 30 and the communications bus 40, the modules automatically interface with the master controller 86 to configure the modules for further communications with the master controller 86 and other modules in the telecommunications power system 10.

The modular design of the telecommunications power system 10 allows a less experienced technician to add modules to the telecommunications power system 10 as needed. The technician simply places a module in an appropriate position in the rack 16 and slides the module in. The master controller periodically transmits an acknowledgment request signal to the modules. If the module was not previously configured, the module generates an identification signal which is received by the controller 86. The identification signal contains a serial number of the module and a request for a module ID. The master controller 86 receives the identification signal, stores the serial number, and assigns the module ID to the module for further serial communications with the master controller 86 and other modules. The controller 86 stores the serial number and the module ID for each module that is connected to the telecommunications power system 107 in a table that is stored in memory of the controller 86. Once the module is configured, it sends a data packet containing the module ID to the master controller 86 to acknowledge receipt of the module ID. When subsequent acknowledgment request signals are transmitted by the master controller 86, the module transmits an acknowledgment message containing the module ID. If the module fails to send an acknowledgement message in response to the acknowledgement request signal, the master controller 86 assumes that the module has been removed and/or is defective.

Figure 4:
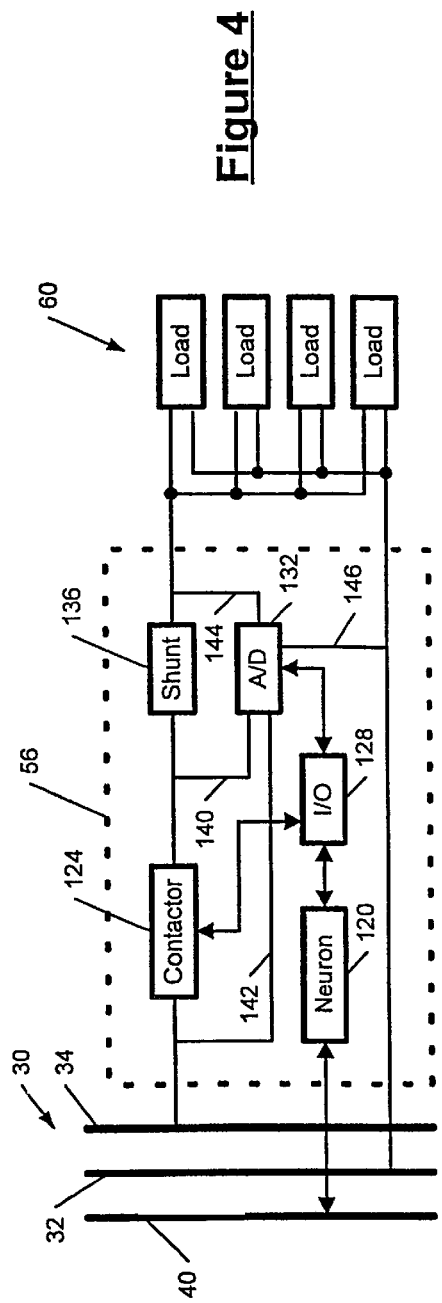
FIG. 4 is a functional block diagram of the load distribution module of FIGS. 2 and 3 in further detail.

Referring now to FIG. 4, the distribution module 56 is illustrated in further detail and includes a neuron 120, a contactor 124, an input/output (I/O) interface 128, an analog to digital (A/D) converter 132, and a shunt 136. Sensing leads 140 and 142 sense a voltage across the contactor 124. The contactor 124 provides load disconnection. The neuron 120 actuates the contactor 124 through the I/O interface 128. Because contactors are a single point of failure, some system operators opt for battery disconnection instead of load disconnection. When the contactor 124 fails, power to the loads is interrupted. When battery disconnection is used, the load is not interrupted when the contactor fails. Both types of disconnection may be employed if desired.

Loads 60 are connected through circuit breakers (not shown) to the distribution module 56. Sensing leads 140 and 144 measure a voltage drop across the shunt 136 so that a calculation of load current is made by the neuron 120 and the A/D convertor 132. Sensing leads 144 and 146 measure a voltage drop across the loads 60. The neuron 120 performs local calculations and processing and provides I/O communications with the master controller 86 and other modules.

Referring now to FIG. 5, the rectifier module 104 is illustrated and includes a rectifier 150, a shunt 152, an A/D converter 154, a neuron 156 and an I/O interface 160. The rectifier 150 is connected to the AC power source 105. The rectifier 150 rectifies the alternating current power input and provides a controllable DC voltage and current output. Sensing leads 170 and 172 measure a voltage drop across the shunt 152 that is used to calculate the rectifier output current. Sensing leads 170 and 174 sense a voltage across the rectifier output. The neuron 156 performs local processing and calculations and provides I/O communications with other modules and the master controller 86.

Figure 6:
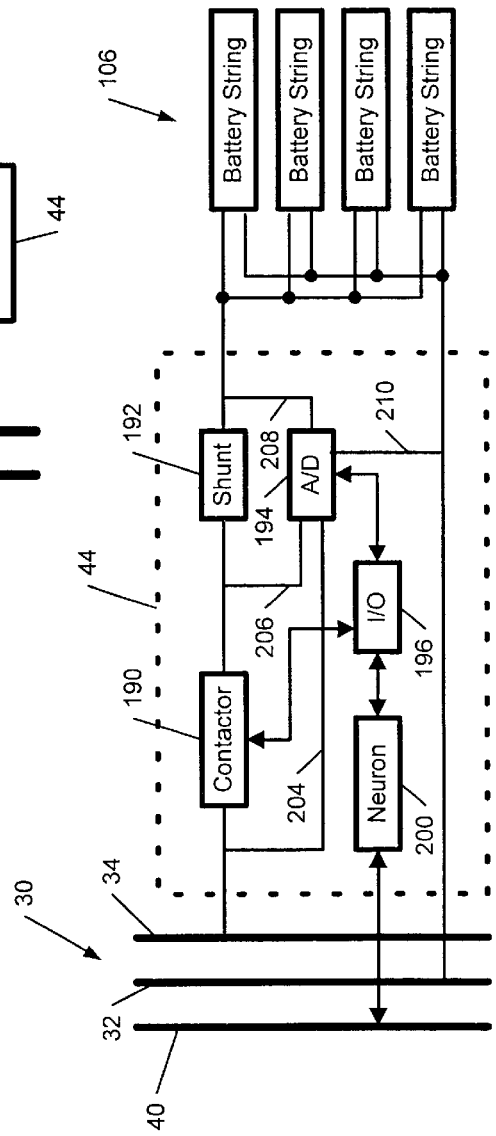
FIG. 6 is a functional block diagram of the battery connection module of FIGS. 2 and 3 in further detail.

Referring now to FIG. 6, the battery connection module 44 is illustrated in further detail. The battery control module 44 includes a contactor 190, a shunt 192, an A/D converter 194, an I/O interface 196, and a neuron 200. The contactor 190 connects and disconnects batteries from the telecommunications power system 10. In particular, the master controller 86 and/or the neuron 200 opens the contactor 190 when the backup batteries discharge below a low voltage disconnect threshold. Sensing leads 204 and 206 sense a voltage drop across the contactor 190. Sensing leads 206 and 208 sense a voltage drop across the shunt 192 that used to calculate the current output of the batteries. Sensing leads 208 and 210 measure a voltage across the batteries. The A/D converter 194 communicates with the I/O interface 196 to provide the current and voltage measurements. The neuron 200 performs local processing and calculations and communicates with other modules and the master controller 86.

Referring back to FIG. 3, when the modules 44, 56 and 104 are initially connected to the telecommunications power system 107, the neurons 120, 156 and 200 transmit the identification signals on the communications bus 40 when the acknowledgement request signal from the master controller 86 is received. The identification signals generated by the modules are received by the master controller 86. The identification signals contain the serial numbers of the modules. The controller stores the serial numbers and assigns module IDs for the modules. The controller 86 transmits the module IDs to the neurons 120, 156 and 200. Subsequent communications to and from modules via the communications bus 40 employ the module IDs. When the master controller 86 transmits the acknowledgement request signal, the modules transmit the acknowledgment message that contains the module ID.

Referring now to FIGS. 7A and 7B, when communicating using a serial communications protocol, each message contains an identifier packet 220 and a data packet 224. The identifier packet 220 contains system information and the module ID during normal communications that occur after configuration. The identifier packet 220 is typically followed by the data packet 224 that generally contains data.

A problem arises when the serial number of the module that is to be connected requires more bits than are available for the module ID in the identifier packet 220. In this situation, only a portion of the serial number can be used in the identifier packet of the identification signal when the module is initially connected. The possibility exists that more than one module will be connected to the communications bus 40 at the same time. Problems occur when the portion of serial number that is selected for one module and that is used in the identification packet matches a portion of the serial number for another module that is used in an identifier packet of a second identification signal.

The CAN serial communications protocol employs arbitration on identifier packets. For example when a first module is initially connected, the first bit of the identifier packet of the identification signal for the first module is sent. If an identifier packet of an identification signal for another module has the same first bit, the second bits of both identifier packets are sent. If the second bits are different, the CAN protocol gives priority to the identifier packet with the "1" bit and the identifier packet with the "0" bit is delayed until after the identifier packet and the data packet of the "priority" message is sent. If, however, two modules have the same identifier packets, a collision will occur in the data packets. Both messages fail when a collision occurs. Since the data packet contains the remaining part of the serial number that is presumably a unique number/letter combination, the data packet for the two modules will never be the same even if the identifier packets are the same. Even when the identifier packets are the same, the data packets are different, a collision is bound to occur and both messages fail.

The CAN protocol defines a 29-bit identifier packet 220 and an 8 byte data packet 224. Some of the bits in the identifier packet may be inherent to the CAN protocol and the remaining bits are user defined. The identifier packet employed in the present invention includes a priority field 226 that contains bits 26–28. Bits 21 through 25 (identified at 228) are currently reserved. A first serial number field 230 includes bits 13 to 20 and contains a byte of the serial number. A flow field 231 contains bit 12 and is set to "0" when a message is traveling from a neuron to the master controller 86. The flow field 231 is set to "1" when the message is travelling from the master controller 86 to the neuron. A command field 232 contains bytes 10 and 11 and identifies an auto configuration function, a peer to peer function, a master to slave function, and a slave to master function. A byte location field 234 contains bits 8 and 9 that identify a first serial number byte of the serial number that is contained in the identifier packet. A second serial number field 236 contains a second byte from the serial number of the module.

The data packet 224 contains a byte "0" with a command field 242 and a neuron group field 244. Bytes 1 through 6 preferably contain consecutive bytes from the serial number of the module when the identification signal is sent.

Initially, the identifier packet contains the 1st byte of the serial number in the first serial number field 230 and the 2nd byte in the second serial number field 236. The 3rd through 8th bytes of the serial number are assigned to the 1st through the 6th bytes, respectively, of the data packet 224. If arbitration occurs, the identifier packet 220 and the data packet 224 remain unchanged. The priority message continues to be sent and the non-priority message is delayed.

If a collision occurs, the identifier packet 220 and the data packet 224 for both modules are changed. The first serial number field 230 is replaced with the 3rd byte of the serial number and the second serial number field 236 is replaced with the 4th byte of the serial number. The 1st through 4th bytes of the data packet 224 are filled with the 5th through 8th bytes of the serial number. The 5th and 6th bytes of the data packet 224 are filled with the 1st and 2nd bytes of the serial number.

If a second collision occurs, the first serial number field 230 is replaced with the 5th byte of the serial number. The second serial number field 236 is replaced with the 6th byte of the serial number. The 1st and 2nd bytes of the data packet 224 are replaced with the 7th and 8th bytes of the serial number. The 3rd through 6th bytes of the data packet 224 are replaced with the 1st through 4th bytes of the serial number. Skilled artisans can appreciate that other techniques for positioning and rotating the bytes of the serial number in the identifier packets and the data packets can be employed when collisions occur without departing from the spirit of the invention.

Referring now to FIG. 8, a flow chart illustrates steps for automatically configuring modules in the telecommunications power system 10. In the preferred embodiment, control occurs in both the master controller 86 and the neurons associated with the modules being configured (such as neurons 120, 156 and 200 in FIG. 3). Skilled artisans can appreciate that other combinations of controllers and neurons may be employed for control. At step 250, control begins. At step 252, the neurons create an identification signal that includes an identifier packet and a data packet after initially being plugged into the rack 16. Alternately, the modules can be connected before the telecommunications system 10 is powered. At step 256, the neuron begins transmitting the identification signal by transmitting each bit of the identifier packet serially via the communications bus 40. At step 258, the neurons determine whether the identifier packet has been successfully sent. If arbitration occurs, the identifier packet may be delayed until the identifier packet can establish priority on the communications bus 40. If the identifier packet has not been sent, control loops back to step 256.

When the identifier packet is sent, control continues with step 260 to transmit the data packet. At step 262, the neuron determines whether there has been a collision with the data packet. If a collision occurs, control continues with step 264 where the neuron creates a new identification signal. The neuron moves the serial number bytes in the identifier packet and the data packet and changes the byte location field 234. Then, control loops to step 256.

If no collision occurs, control continues with step 266 where the master controller 86 stores the bytes of serial number of the module. Preferably, the controller 86 reassembles the bytes into the serial numbers of the modules. Control continues with step 268 where the master controller 86 assigns a module ID to the module. Control continues with step 270 where the master controller 86 transmits the module ID to the module. Then, control continues with step 274 where the neuron of the module employs the module ID in the identifier packets for subsequent serial communications. Control ends with step 276 for this module and controller continues in a similar sequence to configure the remaining modules.

As can be appreciated from the foregoing, the automatic module configuration system according to the invention dramatically simplifies module set up. The skill level required to setup the system or to increase system capacity through the addition of distribution modules, battery connection modules, and/or rectifier modules is decreased as compared to conventional systems. By simplifying set up, the owning and operating costs are reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. An auto-configuration system for a telecommunications power system that supplies power to a telecommunications system, comprising:

a power bus that supplies power to the telecommunications system;

a communications bus;

a module that is connected to said power bus and said communications bus, wherein said module is one of a rectifier module, a distribution module, and a battery connection module; and a controller that is connected to said communications bus, that employs a serial communications protocol, and that periodically transmits acknowledgement request signals to said module, wherein said module transmits a first identification signal to said controller that includes an identification number of said module after said module is initially connected to said power bus and said communications bus and after said module receives a first acknowledgement request signal, wherein said controller stores said identification number, generates a module ID, and transmits said module ID to said module for use in subsequent serial communications, and wherein said module transmits a second identification signal to said controller that includes said module ID when said module receives a second acknowledgement request signal.

2. The auto-configuration system of claim 1 wherein said first and second identification signals include an identifier packet and a data packet that comply with said serial communications protocol.

3. The auto-configuration system of claim 2 wherein said identifier packet contains fewer bits than are required to uniquely identify said identification number.

4. The auto-configuration system of claim 3 wherein said identification number is split between said identifier packet and said data packet.

5. The auto-configuration system of claim 4 wherein said identifier packet contains a command field and a data field that contains first and second bytes of said identification number.

6. The auto-configuration system of claim 5 wherein said identifier packet further includes a byte location field that identifies a location of said first and second bytes within said identification number.

7. The auto-configuration system of claim 6 wherein said serial communications protocol performs arbitration on said identifier packet.

8. The auto-configuration system of claim 7 wherein said module changes said first identification signal when a collision occurs and resends a new identification signal.

9. A method of automatically configuring a telecommunications power system that includes a power bus that supplies power to a telecommunications system, a communications bus, and a controller that is connected to said communications bus, comprising the steps of:

periodically transmitting acknowledgement request signals from said controller to a module that is connected to said power bus and said communications bus, wherein said module is one of a rectifier module, a distribution module, and a battery connection module;

transmitting a first identification signal from said module to said controller that includes an identification number of said module after said module is initially connected to said power bus and said communications bus and after said module receives a first acknowledgement request signal;

storing said identification number in said controller;

generating a module ID for said module;

transmitting said module ID to said module for use in subsequent serial communications;

transmitting a second identification signal from said module to said controller that includes said module ID after said module receives a second acknowledgement request signal.

10. The method of claim 9 further comprising the step of:

coding said first and second identification signals with an identifier packet and a data packet that comply with a serial communications protocol.

11. The method of claim 10 wherein said identifier packet contains fewer bits than are required to uniquely define said identification number.

12. The method of claim 11 further comprising the step of:
splitting said identification number between said identifier packet and said data packet.

13. The method of claim 12 further comprising the step of:
coding a command field and a data field that contains first and second bytes of said identification number in said identifier packet.

14. The method of claim 13 further comprising the step of:
coding a byte location field that identifies a location of said first and second bytes within said identification number in said identifier packet.

15. The method of claim 14 wherein said serial communications protocol performs arbitration on said identifier packet.

16. The method of claim 15 further comprising the step of:
identifying when a collision occurs between said first identification signal for said module and a third identification signal for a second module.

17. The method of claim 16 further comprising the steps of:
generating a new identification signal for said first module; and
transmitting said new identification signal to said controller.

* * * * *